United States Patent
Yasuda et al.

(10) Patent No.: US 12,158,209 B2
(45) Date of Patent: Dec. 3, 2024

(54) SHAFT SEAL

(71) Applicant: NTN CORPORATION, Osaka (JP)

(72) Inventors: Ken Yasuda, Mie (JP); Yoshihiro Takahashi, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/784,646

(22) PCT Filed: Dec. 3, 2020

(86) PCT No.: PCT/JP2020/045066
§ 371 (c)(1),
(2) Date: Jun. 11, 2022

(87) PCT Pub. No.: WO2021/117601
PCT Pub. Date: Jun. 17, 2021

(65) Prior Publication Data
US 2023/0028144 A1   Jan. 26, 2023

(30) Foreign Application Priority Data

Dec. 11, 2019 (JP) .................................. 2019-223402
Sep. 30, 2020 (JP) .................................. 2020-164855
Sep. 30, 2020 (JP) .................................. 2020-164859

(51) Int. Cl.
*F16J 15/3232* (2016.01)

(52) U.S. Cl.
CPC ................. *F16J 15/3232* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 5,401,574 A    3/1995  Masutani et al.
5,414,032 A *  5/1995  Akao ................... B65H 75/50
                                                   524/323
(Continued)

FOREIGN PATENT DOCUMENTS

DE   10341104 A1 *  3/2004  ............ F04C 23/008
EP    1605162 A2    12/2005
(Continued)

OTHER PUBLICATIONS

Machine translation of JP 2008-309304 A dated Dec. 25, 2008.
(Continued)

*Primary Examiner* — Nathan Cumar
(74) *Attorney, Agent, or Firm* — Hedman & Costigan, P.C.; James V. Costigan; Kathleen A. Costigan

(57) ABSTRACT

A shaft seal having a ring shape adheres to an outer peripheral surface of a rotational shaft and thereby seals sealed fluid. The shaft seal partitions a gap between the rotational shaft and a housing to which the shaft seal is mounted, into a high-pressure side and a low-pressure side. The shaft seal is an injection-molded body having a generally U-shape in a sectional view about an axial direction. The shaft seal has a seal lip part that is configured to extend to the high-pressure side and slide on the rotational shaft, and an outer lip part that is disposed at an outer diametrical side relative to the seal lip part. An inclined angle of the seal lip part 2 relative to the outer peripheral surface of the rotational shaft is 5-20 degrees.

14 Claims, 7 Drawing Sheets

(58) Field of Classification Search
CPC .. F16J 15/3232; F16J 15/3236; F16J 15/3248; F16J 15/3252; F16J 15/3268
USPC .......................................................... 277/549
See application file for complete search history.

(56) References Cited

U.S. PATENT DOCUMENTS

| | | | |
|---|---|---|---|
| 6,416,840 B1 | 7/2002 | Miyamori et al. | |
| 2003/0057652 A1* | 3/2003 | Martin .................... | B29C 48/09 |
| | | | 277/654 |
| 2005/0265873 A1* | 12/2005 | Chou ...................... | F04B 35/04 |
| | | | 417/415 |
| 2015/0285390 A1* | 10/2015 | Grau ....................... | F16K 17/04 |
| | | | 277/502 |
| 2019/0285182 A1* | 9/2019 | Moeller ................... | F16J 15/56 |

FOREIGN PATENT DOCUMENTS

| | | |
|---|---|---|
| JP | 05-039384 A | 2/1993 |
| JP | 05-156274 A | 6/1993 |
| JP | 2847277 B | 1/1999 |
| JP | 2003-166649 A | 6/2003 |
| JP | 2003-192778 A | 7/2003 |
| JP | 2004-100563 A | 4/2004 |
| JP | 2008-163226 A | 7/2008 |
| JP | 2008-309304 A | 12/2008 |
| JP | 2013-160303 A | 8/2013 |
| JP | 2014-156935 A | 8/2014 |
| JP | 5876007 B | 3/2016 |
| JP | 2016-124940 A | 7/2016 |
| JP | 2018-017161 A | 2/2018 |
| WO | 96/14359 A1 | 5/1996 |
| WO | 2016/104384 A1 | 6/2016 |
| WO | WO-2016103601 A1 * | 6/2016 .............. F04B 39/00 |

OTHER PUBLICATIONS

Machine translation of JP 2013-160303 A dated Aug. 19, 2013.
Machine translation of JP 2018-017161 A dated Feb. 1, 2018.
Machine translation of JP 2847277 B dated Jan. 13, 1999.
Machine translation of JP 2003-166649 A dated Jun. 13, 2003.
Machine translation of JP 5876007 A dated Mar. 2, 2016.
Machine translation of JP 2014-156935 A dated Aug. 28, 2014.
Machine translation of JP 2004-100563 A dated Apr. 2, 2004.
Machine translation of JP 05-156274 A dated Jun. 22, 1993.
Machine translation of WO 96/14359 A1 dated May 17, 1996.
Machine translation of JP 2008-163226 A dated Jul. 17, 2008.
Machine translation of JP 2003-192778 A dated Jul. 9, 2003.
Machine translation of JP 2016-124940 A dated Jul. 11, 2016.
Machine translation of JP 05-039384 A dated Feb. 19, 1993.
Supplementary European Search Report issued in the corresponding European Patent Application—mailed Nov. 8, 2023.

* cited by examiner

SHAFT SEAL

TECHNICAL FIELD

The present invention relates to a shaft seal for a rotational shaft, in particular a shaft seal for a rotational shaft of a scroll type compressor of an in-vehicle air conditioner.

BACKGROUND ART

A seal member that prevents refrigerant or refrigerator oil from leaking is used in a compressor. For example, in a scroll type compressor having a compression mechanism part in which a fixed scroll and a movable scroll that slews relative to the fixed scroll are combined, a shaft seal is mounted to a rotational shaft that drives the compression mechanism part.

Patent Documents 1 and 2 disclose lip seals as examples of the shaft seal. For example, the lip seal disclosed in Patent Document 1 is shown in FIG. 6. As shown in FIG. 6, a lip seal 21 has inner peripheral seal parts 25, 26, 27 that abut on an outer peripheral surface of a driving shaft 22 in a sectional view along an axial direction of the driving shaft 22. The lip seal 21 has a first seal lip L1 and a second seal lip L2 of which the inner peripheral seal parts 25, 26 are located at an inner side in the axial direction of the driving shaft in a housing 24 relative to fixed parts 28, 29 that are fixed to a shaft hole 23. Further, the lip seal 21 has a third seal lip L3 of which an inner peripheral seal part 27 is located at an outer side in the axial direction of the driving shaft in the housing 24 relative to a fixed part 30 that is fixed to the shaft hole 23. A space S that is capable of retaining lubrication oil therein is formed between the second seal lip L2 and the third seal lip L3. Thus, the second seal lip L2 and the third seal lip L3 are prevented from being worn by the lubrication oil retained in the space S, and the sealing performance is secured. In Patent Document 1, an inclined angle $\theta$ of the second seal lip L2 to the outer peripheral surface of the driving shaft 22 is approximately 30 degrees, however a relation between the inclined angle $\theta$ and the rotation torque has not been considered.

A lip seal disclosed in Patent Document 2 is shown in FIG. 7. As shown in FIG. 7, a lip seal 31 has a first seal element 34 mounted between a housing 32 and a rotational shaft 33 and having a seal lip part 35, and a second seal element 36 having a seal lip part 37. The seal lip part 35 of the first seal element 34 and the seal lip part 37 of the second seal element 36 prevent fluid (refrigerant or refrigerator oil) in a fluid container R from leaking to a low-pressure side A. The first seal element 34 is formed of synthetic rubber. The second seal element 36 is formed of synthetic resin such as polytetrafluoroethylene (PTFE) resin. When the rotational shaft is not rotated, the seal lip part 35 of the first seal element 34 elastically abuts on the rotational shaft 33 to prevent the fluid from leaking. Further, the seal lip part 37 of the second seal element 36 seals the fluid that slightly leaks out of the first seal element 34 in rotating of the rotational shaft. However, Patent Document 2 does not refer to the inclined angle of the first seal element 35 relative to the outer peripheral surface of the rotational shaft.

A shaft seal having a generally U-shape section has been known as a shaft seal having a simple structure. For example, Patent Document 3 discloses a U-shape seal having a bottom wall, an inner lip part and an outer lip part, as a generally U-shape shaft seal. The U-shape seal is mounted to a recessed peripheral groove for allowing the mount of the seal, so that the inner lip part thereof slidably abuts on a rotational shaft. In the U-shape seal, a back surface of the bottom wall is formed to be flat so as to adhere to an inner end surface of the recessed peripheral groove, and an outer corner portion of each of end corner portions of the bottom wall is formed perpendicularly so as to form a straight portion having a specified height from the back surface, on each of an inner surface and an outer surface of the U-shape seal. Further, a gradient portion is formed from a distal end of each of the straight portions so that tip ends of the inner lip part and the outer lip part protrude to be inclined toward respective directions away from each other. In a free state of the U-shape seal, the gradient portion is inclined at specified angle relative to the axial line.

Patent Document 4 discloses a seal ring suitable to a scroll type compressor. Relating to a shape of the seal ring, a rectangular ring and a U-shape seal ring (a ring seal having a generally U-shape section) are disclosed. The seal ring is a molded body of a resin composition. An example of the resin composition is disclosed that contains 1-7 mass % of chemical powder having a layered crystal structure and 8-27 mass % of denatured polytetrafluoroethylene powder relative to 100 mass % of polyethersulfone. It is also disclosed that this resin composition may contain elastomer and in a case in which the content thereof is less than 7.5 mass %, the bending elastic modulus can be decreased without deteriorating wear resistance and a mechanical property represented by elongation at break.

Patent Document 5 discloses a seal ring formed by a mixture that contains soft resin formed of at least one of thermoplastic elastomer and dynamically vulcanized resin, and hard resin.

PRIOR ART DOCUMENTS

Patent Documents

Patent Document 1: JP 2018-017161 A
Patent Document 2: JP 2847277 B
Patent Document 3: JP 2003-166649 A
Patent Document 4: JP 5876007 B
Patent Document 5: JP 2014-156935 A

SUMMARY OF THE INVENTION

Problems to be Solved by the Invention

In each of Patent Documents 1 and 2, the rotational torque and the sealing performance when the inclined angle of the seal lip relative to the outer peripheral surface of the rotational shaft and the length of the seal lip in a sectional view are changed have not been examined. Further, the lip seal disclosed in each of Patent Documents 1 and 2 has a complicated shape formed by a metal ring core and a plurality of seal lips formed of resin or rubber, and thus cost thereof might be high.

In Patent Document 3, the inclined angle of the gradient part of the generally U-shape shaft seal is considered, however the inclined angle of the seal lip relative to the outer peripheral surface of the rotational shaft in a state in which the shaft seal is mounted to the rotational shaft has not been examined. Also, the rotational torque and the sealing performance when the length of the seal lip in the sectional view is changed have not been examined. In each of Patent Documents 4 and 5, the specific sectional shape of the seal lip has not disclosed.

An object of the present invention is, in order to solve such problems, to provide a shaft seal having a generally U-shape section that is capable of decreasing rotational torque and realizing superior sealing performance.

Means for Solving the Problems

A shaft seal of the present invention having a ring shape is configured to adhere to an outer peripheral surface of a rotational shaft and seal sealed fluid. The shaft seal partitions a gap between the rotational shaft and a housing to which the shaft seal is mounted, into a high-pressure side and a low-pressure side. The shaft seal is formed of an injection-molded body having a generally U-shape in a sectional view about an axial direction. The shaft seal comprises a seal lip part that is configured to extend to the high-pressure side and slide on the rotational shaft, and an outer lip part that is disposed at an outer diametrical side relative to the seal lip part. An inclined angle of the seal lip part relative to the outer peripheral surface of the rotational shaft is 5-20 degrees. The length of the seal lip part in the sectional view about the axial direction of the shaft seal is 2.0-6.5 mm. The "inclined angle of the seal lip part" of the present invention denotes an angle of the seal lip part relative to the outer peripheral surface of the rotational shaft in a state in which the shaft seal is mounted to the rotational shaft.

The shaft seal may be formed of a resin composition or a thermoplastic elastomer composition.

The bending elastic modulus based on ASTM D790 of the shaft seal may be 200-2,400 MPa.

The shaft seal may be formed of a resin composition that contains ethylene-tetrafluoroethylene copolymer (ETFE) resin or tetrafluoroethylene-perfluoroalkoxyethylene copolymer (PFA) resin as a main component.

The resin composition may contain 1-20 vol % of at least one of carbon fiber, graphite, and PTFE resin relative to 100 vol % of the resin composition.

The resin composition may contain the carbon fiber of which the average fiber length is 20-200 μm.

The shaft seal may be formed of a thermoplastic elastomer composition that contains polyester elastomer as a main component. The polyester elastomer may be a copolymer of a hard segment having an aromatic polyester unit, and a soft segment having a polyester unit or a polyether unit.

The aromatic polyester unit may have a naphthalene ring.

The thermoplastic elastomer composition may contain 1-40 vol % of PTFE resin relative to 100 vol % of the thermoplastic elastomer composition.

As the inner diameter size of the shaft seal before the rotational shaft is mounted thereto is defined as d, the outer diameter size of the rotational shaft is defined as D, and the interference of the shaft seal against the rotational shaft is defined as (D−d), the shaft seal may fulfill (D−d)/D=0.005-0.06.

The shaft seal may be configured to be used in a scroll type compressor having a compression mechanism in which a fixed scroll and a movable scroll that slews relative to the fixed scroll are combined. The rotational shaft may be configured to drive the compression mechanism.

The scroll type compressor may be configured as a scroll type compressor of an in-vehicle air conditioner.

The sealed fluid may contain oil.

Further, a shaft seal of the present invention having a ring shape is configured to adhere to an outer peripheral surface of a rotational shaft and seal sealed fluid. The shaft seal partitions a gap between the rotational shaft and a housing to which the shaft seal is mounted, into a high-pressure side and a low-pressure side. The shaft seal has a generally U-shape in a sectional view about an axial direction. The shaft seal comprises a seal lip part that is configured to extend to the high-pressure side and slide on the rotational shaft, and an outer lip part that is disposed at an outer diametrical side relative to the seal lip part. The shaft seal is a molded body of a resin composition that contains ETFE resin or PFA resin as a main component. As the inner diameter size of the shaft seal before the rotational shaft is mounted thereto is defined as d, the outer diameter size of the rotational shaft is defined as D, and the interference of the shaft seal against the rotational shaft is defined as (D−d), the shaft seal fulfills (D−d)/D=0.005-0.06.

Further, a shaft seal of the present invention having a ring shape is configured to adhere to an outer peripheral surface of a rotational shaft, and seal sealed fluid that contains oil. The shaft seal has a generally U-shape in a sectional view about an axial direction. The shaft seal comprises a seal lip part that is configured to extend to one side in the axial direction and slide on the rotational shaft, and an outer lip part that is disposed at an outer diametrical side relative to the seal lip part. The shaft seal is a molded body of a thermoplastic elastomer composition that contains polyester elastomer as a main component. The bending elastic modulus based on ASTM D790 of the shaft seal is 200-2,400 MPa.

Effect of the Invention

The shaft seal of the present invention has a generally U-shape in the sectional view about the axial direction, and comprises the seal lip part that is configured to extend to the high-pressure side and slide on the rotational shaft, and the outer lip part that is disposed at the outer diametrical side relative to the seal lip part. In addition, the inclined angle of the seal lip part relative to the outer peripheral surface of the rotational shaft is 5-20 degrees. This configuration derives appropriate tightening force against the rotational shaft, and thus the rotational torque can be decreased and superior sealing performance can be realized. Further, the length of the seal lip part in the sectional view about the axial direction of the shaft seal is 2.0-6.5 mm, and thus the seal lip part has the length to some extent. Accordingly, the tightening force of the seal lip part against the rotational shaft is decreased and further low torque can be realized.

The shaft seal is formed of a resin composition or a thermoplastic elastomer composition. This configuration eliminates the need for a metal core, so that superior cost performance can be realized.

The bending elastic modulus based on ASTM D790 of the shaft seal is 200-2,400 MPa. This configuration enhances the flexibility of the shaft seal, so that the tightening force of the shaft seal can be appropriately decreased.

Since the shaft seal is formed of a resin composition that contains ETFE resin or PFA resin as a main component, superior flexibility can be realized and the shaft seal can be molded by means of injection molding. Further, since the resin composition is superior in chemical resistance and oil resistance, the shaft seal is suitably used in an environment in the presence of fluid such as a refrigerant and oil.

Since the resin composition contains 1-20 vol % of at least one of carbon fiber, graphite and polytetrafluoroethylene resin relative to 100 vol % of the resin composition, superior friction and wear performance can be realized. In addition, since the resin composition contains the carbon fiber of which the average fiber length is 20-200 μm, the melt viscosity of the resin composition can be suppressed to be increased, compared to a configuration in which the resin composition employs carbon fiber having longer length. Thus, the shaft seal can be easily molded by means of the injection molding.

Since the value of (D−d)/D which is obtained by dividing the interference (D−d) by the outer diameter size D of the rotational shaft is set in the above-described range, the rotational torque can be decreased without deteriorating the sealing performance.

The shaft seal is formed of a thermoplastic elastomer composition that contains polyester elastomer as a main component, and the polyester elastomer is a copolymer of a hard segment having an aromatic polyester unit, and a soft segment having a polyester unit or a polyether unit. This configuration derives superior flexibility and moldablity. In addition, since the aromatic polyester unit has a naphthalene ring, the chemical resistance and the oil resistance can be improved. Thus, the shaft seal is suitably used in an environment in the presence of fluid that contains oil.

The thermoplastic elastomer composition contains 1-40 vol % of PTFE resin relative to 100 vol % of the thermoplastic elastomer composition. This configuration can reduce the dynamic friction coefficient while securing its elongation property.

MODE FOR CARRYING OUT THE INVENTION

Figure 1:
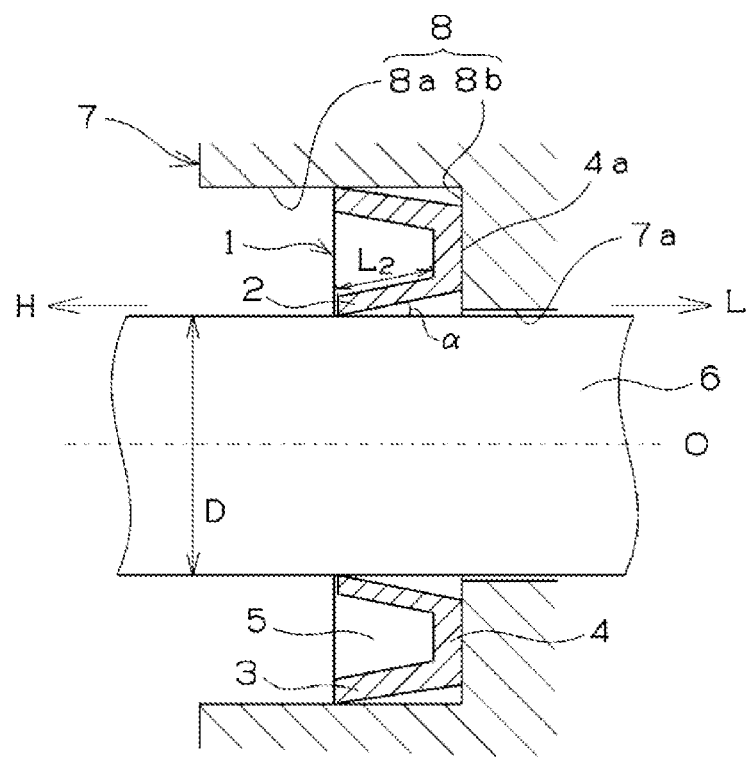
FIG. 1 is a sectional view of an example of a shaft seal of the present invention, the shaft seal being mounted to a rotational shaft.

A compressor to which a shaft seal of the present invention is applied is described with reference to FIG. 1. FIG. 1 is an axial sectional view of the shaft seal mounted to a rotational shaft. As shown in FIG. 1, a shaft seal 1 is a ring member having a generally U-shape in a sectional view about an axial direction. The shaft seal 1 includes a seal lip part 2 disposed at a seal inner diametrical side to extend toward one side in the axial direction, and an outer lip part 3 disposed at a seal outer diametrical side relative to the seal lip part 2. Each of the seal lip part 2 and the outer lip part 3 extends from a base part 4. The seal lip part 2, the outer lip part 3 and the base part 4 form a recessed groove 5. A housing 7 has an insertion hole 7a into which a rotational shaft 6 is inserted, and an annular groove 8 formed around the insertion hole 7a. The shaft seal 1 is mounted to the annular groove 8. When the rotational shaft 6 rotates around an axis O, the seal lip part 2 slides on the rotational shaft 6.

In the example shown in FIG. 1, the shaft seal 1 is mounted to the annular groove 8 such that the seal lip part 2 and the outer lip part 3 extend toward a high-pressure side H, respectively. In this case, a side of the recessed groove 5 corresponds to the high-pressure side H, and a side of a back surface 4a of the base part 4 corresponds to a low-pressure side L. In a state in which the shaft seal 1 is mounted, a portion near the tip end of the outer lip part 3 of the shaft seal 1 abuts on a side wall 8a of the annular groove 8, and a portion near the tip end of the seal lip part 2 abuts on an outer peripheral surface of the rotational shaft 6. Further, the back surface 4a of the base part 4 adheres to a bottom wall 8b of the annular groove 8. A space is formed between the outer lip part 3 and the side wall 8a. Also, a space is formed between the seal lip part 2 and the rotational shaft 6.

The present inventors discovered that low torque property and low leak performance can be realized by optimizing an inclined angle α of the seal lip part 2 relative to the outer peripheral surface of the rotational shaft 6 and a lip length $L_2$ of the seal lip in a sectional view, as knowledge relating to the generally U-shape shaft seal 1 having a simple structure. Specifically, the shaft seal 1 shown in FIG. 1 is configured such that the inclined angle α of the seal lip part 2 is 5-20 degrees, and the lip length $L_2$ of the seal lip part 2 is 2.0-6.5 mm. In a case in which the inclined angle α is less than 5 degrees, the seal lip part 2 and the rotational shaft 6 are substantially parallel to each other, so that fluid might leak easily. In a case in which the inclined angle α is more than 20 degrees, the tightening force of the seal lip part 2 against the rotational shaft 6 becomes large, so that the rotational torque might be increased. The inclined angle α is preferably 10-20 degrees.

Further, in a case in which the lip length $L_2$ is less than 2.0 mm, the seal lip part 2 is hardly deformed and thus the tightening force becomes large, so that the rotational torque might be increased. When the lip length $L_2$ is too long, a space for allowing the shaft seal to be assembled thereto becomes large. Thus, the upper limit of the lip length $L_2$ is set to, for example, 8.0 mm. The lip length $L_2$ is preferably 4.2-6.5 mm.

Figure 2:
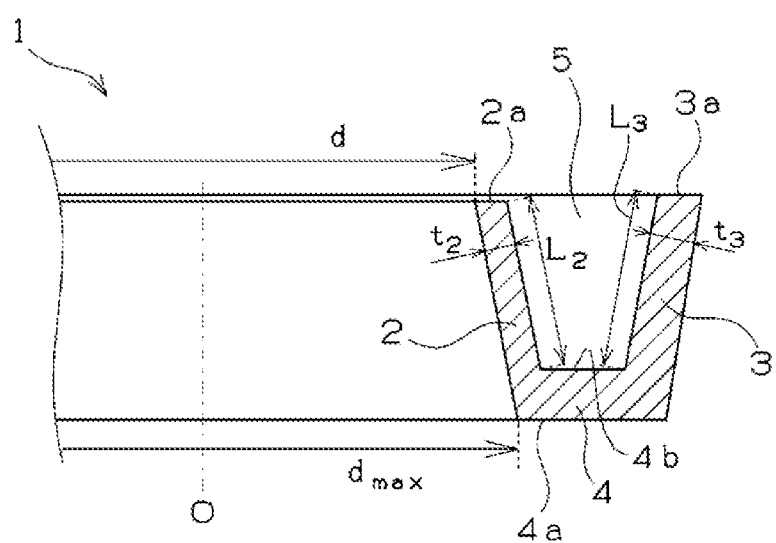
FIG. 2 is an enlarged sectional view of the shaft seal shown in FIG. 1 before mounted.

Dimensions in the shaft seal 1 are described with reference to FIG. 2. FIG. 2 shows the shaft seal before mounted to the housing (a free state). In the shaft seal 1, the seal lip part 2 and the outer lip part 3 are formed to be inclined such that the tip end parts 2a, 3a are directed to be away from each other. In the present invention, the inner diameter size d of the shaft seal 1 is the minimum inner diameter size of the shaft seal 1. The inner diameter size d corresponds to a distance between portions in the sectional view shown in FIG. 2 of the tip end part 2a of the seal lip part 2. The maximum inner diameter size $d_{max}$ of the shaft seal 1 is the maximum distance between the portions in the sectional view shown in FIG. 2 of the base part 4, namely a distance between corresponding inner edges of the back surface 4a in FIG. 2. In the example shown in FIG. 2, the inner peripheral surface of the shaft seal 1 is formed such that the diameter is continuously decreased from the back surface 4a toward the tip end part 2a. The outer peripheral surface of the shaft seal 1 is formed such that the diameter is continuously increased from the back surface 4a toward the tip end part 3a.

The seal lip part 2 has the specified lip length $L_2$ in the outer peripheral surface thereof. As shown in FIG. 2, the lip length $L_2$ is a length of a straight line between a corner part (at the side of the seal lip part 2) of a bottom surface 4b of the shaft seal 1 and a tip end at the outer diametrical side of the tip end part 2a of the seal lip part 2. Further, in the example shown in FIG. 2, each of the back surface 4a and the bottom surface 4b is formed as a flat plane substantially parallel to a plane orthogonal to an axis of the shaft seal 1. Accordingly, the shaft seal 1 easily adheres to the bottom wall 8b of the annular groove 8 (see FIG. 1). The lip length $L_2$ in the free state of the shaft seal shown in FIG. 2 is the same as the lip length $L_2$ in a mounted state of the shaft seal shown in FIG. 1.

The outer lip part 3 has the specified lip length $L_3$ in the inner peripheral surface thereof. As shown in FIG. 2, the lip length $L_3$ is a length of a straight line between a corner part (at the side of the outer lip part 3) of the bottom surface 4b of the shaft seal 1 and a tip end at the inner diametrical side of the tip end part 3a of the outer lip part 3. It is preferable that the lip length $L_3$ of the outer lip part 3 is longer than the lip length $L_2$ of the seal lip part 2.

It is preferable that the thickness $t_2$ of the seal lip part 2 is 0.3-1 mm. Ina case in which the thickness $t_2$ is changed from the side of the base part toward the tip end part, it is preferable that the thickness $t_2$ is changed within the range of 0.3-1 mm. In a case in which the thickness $t_2$ is less than 0.3 mm, a short shot might be caused during the injection molding. In a case in which the thickness $t_2$ is more than 1 mm, the tightening force of the seal lip part 2 against the rotational shaft becomes large, so that the rotational torque might be increased. The thickness $t_2$ is preferably 0.3-0.6 mm. Further, from another point of view, as shown in FIG. 2, it is preferable that the thickness $t_2$ of the seal lip part 2 is smaller than the thickness $t_3$ of the outer lip part 3. In a case in which the thickness $t_2$ is larger than the thickness $t_3$, the tightening force of the outer lip part 3 against the housing 7 becomes smaller than the tightening force of the seal lip part 2 against the rotational shaft 6, so that sliding might be caused between the outer lip part 3 and the side wall 8a of the housing 7.

The description is returned to FIG. 1. The shaft seal 1 is configured such that the seal lip part 2 adheres to the outer peripheral surface of the rotational shaft 6 so that the fluid at the high-pressure side H is prevented from leaking to the low-pressure side L. Examples of the fluid include refrigerant, oil, and the mixture of refrigerant and oil. In order to secure the sealing performance of the shaft seal, it is necessary that the inner diameter size d (see FIG. 2) of the shaft seal 1 before mounted is set to be smaller than the outer diameter size D of the rotational shaft 6. That is, it is necessary that the shaft seal 1 has the interference in assembling of the shaft seal 1 to the rotational shaft 6.

A relation between the inner diameter size d of the shaft seal 1, the outer diameter size D of the rotational shaft 6, and the interference (D−d) against the rotational shaft 6 before the rotational shaft 6 is mounted to the shaft seal 1 is not especially limited, however it is preferable to fulfill that (D−d)/D=0.005-0.06, more preferably (D−d)/D=0.005-0.03, furthermore preferably (D−d)/D=0.01-0.02. By setting the dimension ratio of the interference (D−d) of the tip end part of the seal lip part that abuts on the rotational shaft 6 to the outer diameter size D of the rotational shaft 6, within the specified range, the rotational torque can be decreased without deteriorating the sealing performance.

Further, in order to decrease the rotational torque, as shown in FIG. 1, it is preferable that a space is formed between the seal lip part 2 and the rotational shaft 6. In this case, the base part 4 does not contact with the rotational shaft 6 in the mounted state. Further, relating to the dimensional relation, it is preferable that $D<d_{max}$ (see FIG. 2) is fulfilled.

The outer diameter size D of the rotational shaft 6 is approximately 10-50 mm, but is not especially limited thereto. The interference (D−d) is approximately 0.1-3 mm, but is not especially limited thereto.

Figure 3:
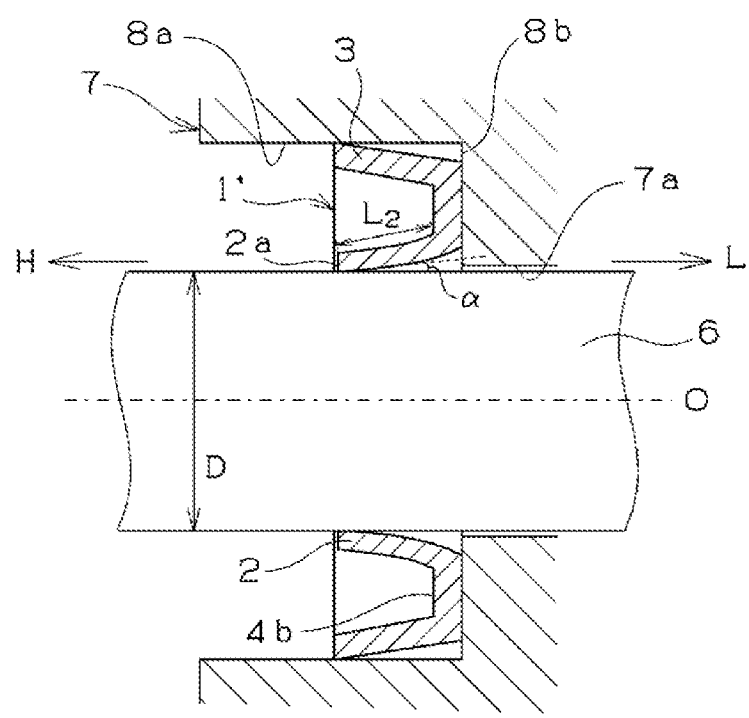
FIG. 3 is a sectional view of another example of the shaft seal of the present invention, the shaft seal being mounted to the rotational shaft.

The shaft seal of the present invention is not limited to the example shown in FIG. 1. The seal lip part 2 is formed to be a linear shape in the example shown in FIG. 1, however the seal lip part may be formed to be a curved shape as shown in FIG. 3. In the example shown in FIG. 3, the inclined angle α corresponds to an angle between a tangent (shown by a dashed line) of the seal lip part 2 at a contact point of the seal lip part 2 and the rotational shaft 6, and the outer peripheral surface of the rotational shaft 6. The lip length $L_2$ of the seal lip part 2 corresponds to the length of the straight line that is described above with reference to FIG. 2. Further, a lip part other than the seal lip part and the outer lip part (for example, a dust lip that slides on the rotational shaft) may be disposed in the shaft seal.

In the compressor shown in FIG. 1, a compression mechanism part is disposed at the high-pressure side H in the housing 7. The compression mechanism part is configured to compress the fluid using rotation of the rotational shaft. A scroll type or swash plate type compression mechanism part may be employed. For example, in a case in which the scroll type compression mechanism part is employed, the compression mechanism part is formed by a fixed scroll and a movable scroll that slews relative to the fixed scroll, combined with each other.

Figure 4:
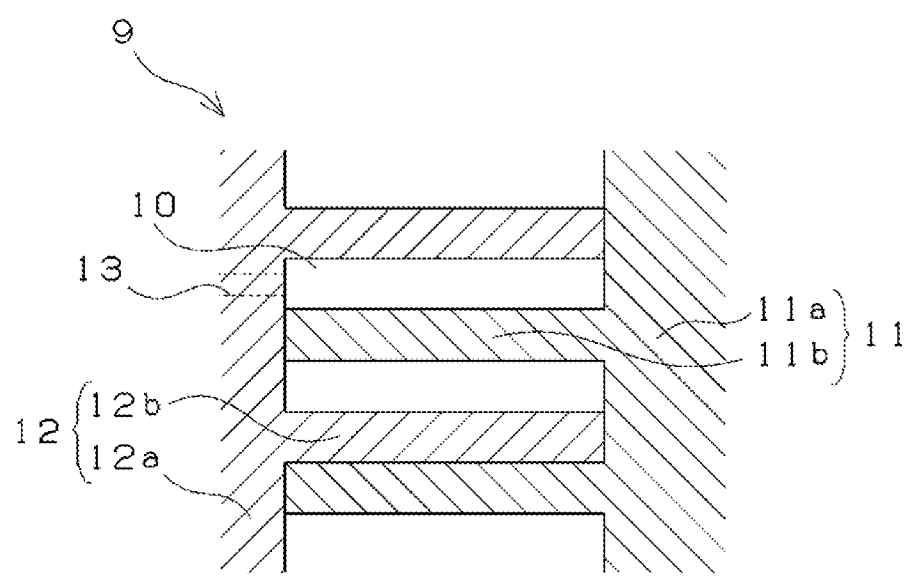
FIG. 4 is a schematic sectional view of a compression mechanism part of a scroll type compressor.

FIG. 4 shows a sectional view of a portion of the scroll type compression mechanism part. As shown in FIG. 4, a compression mechanism part 9 includes a fixed rotor 11 that has a base plate 11a and a fixed side scroll blade 11b vertically disposed on a surface of the base plate 11a, and a movable rotor 12 that has a base plate 12a and a movable side scroll blade 12b vertically disposed on a surface of the base plate 12a. The fixed rotor 11 and the movable rotor 12 are alternately and eccentrically meshed with each other so that a compression chamber 10 is formed therebetween. The movable rotor 12 is directly or indirectly connected to the rotational shaft. When the movable rotor 12 rotates around an axial line of the fixed rotor 11, the compression chamber 10 moved to the center side of the spiral shape so that the fluid is compressed. The compressed fluid is discharged from a discharge pipe through a discharge port 13 formed in the center portion of the movable rotor 12 so as to flow out to a refrigeration cycle. Thereafter, the fluid (refrigerant gas or the like) in the refrigeration cycle is introduced into the compression chamber 10 through an inlet port (not shown).

The shaft seal of the present invention is an injection-molded body formed of a resin composition or a thermoplastic elastomer composition. It is preferable that the bending elastic modulus of the injection-molded body measured based on ASTM D790 is 200-2, 400 MPa. Ina case in which the bending elastic modulus is less than 200 MPa, the injection-molded body is easily worn and thus the sealing performance might be deteriorated. In a case in which the bending elastic modulus is more than 2,400 MPa, the tightening force of the shaft seal against the rotational shaft becomes large, so that the torque might be increased. The bending elastic modulus of the resin composition, which forms the shaft seal of the present invention, measured based on ASTM D790 is preferably 200-1,800 MPa, more preferably 400-1,800 MPa.

An example of the shaft seal formed by a molded body of a resin composition is now described.

The resin (base resin) as a main component in the resin composition is not especially limited. Examples of the resin (base resin) include polyamide (PA) resin, polyphenylene sulfide (PPS) resin, polyether ether ketone (PEEK) resin, polyamide-imide (PAI) resin, polytetrafluoroethylene (PTFE) resin, tetrafluoroethylene-perfluoroalkoxyethylene copolymer (PFA) resin, tetrafluoroethylene-hexafluoropropylene copolymer (FEP) resin, ethylene-tetrafluoroethylene copolymer (ETFE) resin, polyvinyl fluoride resin, liquid crystal polymer, polyether sulfon resin, polysulfone resin, polyphenyl sulfone resin, polyarylate resin, polyether-imide resin, polyimide resin, and polyester resin.

Of these resins, PA resin, PFA resin, FEP resin, ETFE resin, and polyvinyl fluoride resin that have superior heat resistance, chemical resistance and flexibility and that are injection-moldable resins are preferably employed. These resins superior in chemical resistance and oil resistance are suitable to, for example, the shaft seal for the rotational shaft of the compressor used in presence of fluid in which the refrigerant and the refrigerator oil are mixed. In particular, ETFE resin or PFA resin is preferably employed. In a case in which the resin composition contains ETFE resin or PFA resin each having superior flexibility as a main component, damage of the shaft seal in mounting is easily prevented even when the interference is secured to some extent. Further, by securing the interference to some extent, the sealing performance of the shaft seal 1 can be maintained even when the seal lip part is worn due to the use of the shaft seal 1.

In a case in which the ETFE resin is employed as the base resin in the shaft seal, the melt flow rate (MFR) of the resin composition based on ASTM D3159 is preferably 10-50 g/10 minutes, more preferably 30-50 g/10 minutes. Further, in a case in which the PFA resin is employed as the base resin in the shaft seal, the melt flow rate (MFR) of the resin composition based on ASTM D3307 is preferably 10-80 g/10 minutes, more preferably 30-50 g/10 minutes. As the MFR is larger, the melt viscosity of the resin composition becomes lower, so that the seal lip part is molded easily by the injection molding.

The ETFE resin has a chemical structure shown in the following formula (1), and the copolymerization rate thereof is not especially limited. Examples of the ETFE resin, which is commercially available, employed in the present invention include Fluon C-88AP and Fluon C-88AXMP produced by AGC Inc.

Chemical 1

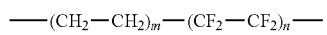

(1)

In a case in which the ETFE resin is employed as the base resin, the resin composition contains preferably 70 vol % or more of the ETFE resin, more preferably 80 vol % or more of the ETFE resin, further more preferably 90 vol % or more of the ETFE resin, relative to 100 vol % of the resin composition.

The PFA resin has a chemical structure shown in the following formula (2), and the copolymerization rate thereof is not especially limited. In the formula (2), $R_f$ denotes a perfluoroalkyl group. Examples of the PFA resin, which is commercially available, employed in the present invention include Fluon C-62XP produced by AGC Inc., Neoflon AP-210 and AP-202 produced by DAIKIN INDUSTRIES, Ltd., Teflon (registered trademark) 440HP-J, 420HP-J, and 411HP-J produced by Chemours-Mitsui Fluoroproducts Co., Ltd., and Dyneon PFA 6515TZ and PFA 6525TZ produced by 3M Japan Limited.

Chemical 2

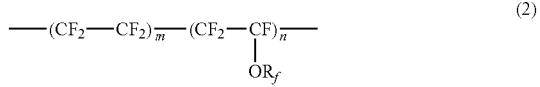

(2)

In a case in which the PFA resin is employed as the base resin, the resin composition contains preferably 70 vol % or more of the PFA resin, more preferably 80 vol % or more of the PFA resin, further more preferably 90 vol % or more of the PFA resin, relative to 100 vol % of the resin composition.

The resin composition used in the present invention contains at least one of carbon fiber, graphite and PTFE resin by preferably 1-20 vol %, more preferably 1-10 vol %, relative to 100 vol % of the resin composition. For example, the resin composition that contains the carbon fiber by 1 vol % or more is liable to reduce a wear amount and deformation caused by pressure. The graphite and the PTFE resin are solid lubricants, and the resin composition that contains the graphite and/or the PTFE resin by 1 vol % or more is liable to reduce a dynamic friction coefficient of a molded body of the resin composition. Any one of the carbon fiber, the graphite, and the PTFE resin may be employed alone, or alternatively a combination of two or more of them may be employed. A further preferable resin composition contains the carbon fiber, the graphite, and the PTFE resin by total 1-20 vol % (more preferably 1-10 vol %), relative to 100 vol % of the resin composition.

In a case in which the carbon fiber is compounded, any of pitch based carbon fiber and PAN based carbon fiber that are classified based on raw material may be employed. The baking temperature is not limited, and thus either graphitized material baked at 2,000° C. or more and carbonized material baked at 1,000-1,500° C. may be employed. The fiber diameter is not limited, however the carbon fiber having the average fiber diameter of 5-20 μm may be employed. Either milled fiber and chopped fiber may be employed, however the milled fiber is preferable because it is short fiber that hardly increases the MFR of the resin composition. The average fiber length of the milled fiber is especially preferably 20-200 μm. A method for measuring the average fiber length is, for example, a method measuring by using a scanning electron microscope (SEM) image photographed by a scanning electron microscope.

Examples of the milled fiber, which is commercially available, employed in the present include KRECAM-101S, M-101F, and M-201S produced by Kureha Corporation. Further, examples of the PAN based carbon fiber include HT M800 160MU and HT M100 40MU produced byTEIJIN LIMITED and Trayca MLD-30 and MLD-300 produced by Toray Industries, Inc.

Any of natural graphite and artificial graphite may be employed as the graphite. An example of the natural graphite includes ACP produced by Nippon Graphite Industries, Co., Ltd. Examples of the artificial graphite include CGB-10, CGB-20 and CGB-50 produced by Nippon Graphite Industries, Co., Ltd., and KS-6, KS-25 and KS-44 produced by Imerys Graphite & Carbon Japan Ltd.

As the PTFE resin, any of molding powder obtained through a suspension polymerization method, fine powder obtained through an emulsion polymerization method, and recycled PTFE may be employed. In order to stable the flowability of the resin composition, it is preferable to employ the recycled PTFE that is hardly fibered by the shearing in injection molding and hardly decreases the MFR. The recycled PTFE denotes heat-treated powder (heat hysteresis has been applied), or powder that has been irradiated with y rays or electron rays. Examples of the recycled PTFE include: powder obtained by heat-treating the molding powder or the fine powder; powder obtained by irradiating the powder obtained by heat-treating the molding powder or the fine powder, with y rays or electron rays; powder obtained by grinding a molded body of the molding powder or the fine powder; powder obtained by irradiating the powder obtained by grinding a molded body of the molding powder or the fine powder, with y rays or electron rays; and powder obtained by irradiating the molding powder or the fine powder with y rays or electron rays.

Examples of the PTFE resin, which is commercially available, employed in the present invention, include KTL-610, KTL-450, KTL-350, KTL-8N, and KTL-400H produced by KITAMURA LIMITED; Teflon (registered trademark) 7-J and TLP-10 produced by Chemours-Mitsui Fluoroproducts Co., Ltd.; Fluon G163, L150J, L169J, L170J, L172J, and L173J produced by AGC Inc.; Polyflon M-15 and Lubron L-5 produced by DAIKIN INDUSTRIES, LTD.; and Dyneon TF9205 and TF9207 produced by 3M Japan Limited. Further, PTFE resin modified by a perfluoroalkylether group, a fluoroalkyl group, or a side chain group containing other fluoroalkyl may be employed. Examples of the PTFE resin irradiated with y rays or electron rays among the PTFE resins described above include KTL-610, KTL-450, KTL-350, and KTL-8N produced by KITAMURA LIMITED, and Fluon L169J, L170J, L172J, and L173J produced by AGC Inc.

A fiber reinforcing material such as aramid fiber; a spherical filler such as spherical silica; a scaly reinforcing material such as mica; a sliding reinforcing material such as calcium phosphate and calcium sulfate; and a fine fiber reinforcing material such as potassium titanate whisker may be employed in the resin composition to such an extent that does not deteriorate the effect of the present invention. A colorant such as carbon black and iron oxide may be also compounded. Any one of them may be compounded alone, or alternatively a combination of two or more of them may be compounded.

Further, elastomer may be compounded in order to decrease the elastic modulus of the resin composition. Fluororubber is preferable as the elastomer. The kind of the fluororubber is not limited, and thus a vinylidene fluoride fluororubber (FKM), a tetrafluoroethylene-propylene fluororubber (FEPM), or a tetrafluoroethylene-perfluorovinylether fluororubber (FFKM) may be employed. FKM of any of bipolymer and terpolymer may be employed.

From the above-described point of view, the especially preferable configuration of the shaft seal formed of the resin composition contains the ETFE resin or the PFA resin by 90 vol % or more and at least one of the carbon fiber, the graphite and the PTFE resin by total 1-10 vol %, relative to 100 vol % of the resin composition, and the bending elastic modulus of the shaft seal based on ASTM D790 is 200-1,800 MPa.

Next, an example of the shaft seal formed by a molded body of a thermoplastic elastomer composition is described.

The elastomer as a main component in the thermoplastic elastomer composition is not especially limited. Examples of the elastomer include polyolefin elastomer, polyester elastomer, and polyamide elastomer. The polyester elastomer is especially preferable from a viewpoint of heat resistance and chemical resistance. The polyester elastomer has a hard segment and a soft segment. The hard segment comprises a polyester unit, and the soft segment comprises a polyether unit or a polyester unit. The polyester elastomer is a polyester-polyether multi-block copolymer or a polyester-polyester multi-block copolymer.

The polyester unit in the hard segment preferably comprises mainly an aromatic polyester unit. Generally, the aromatic polyester unit is a polyester unit having an aromatic dicarboxylic acid component and a diol component as polymer components.

Examples of the aromatic dicarboxylic acid component include aromatic dicarboxylic acid, and ester derivative thereof. Examples of the aromatic dicarboxylic acid include terephthalic acid, isophthalic acid, phthalic acid, naphthalenedicarboxylic acid (naphthalene-2,6-dicarboxylic acid, naphthalene-2,7-dicarboxylic acid, etc.), 4,4'-diphenyldicarboxylic acid, and 4,4'-diphenyletherdicarboxylic acid. Examples of the ester derivative of the aromatic dicarboxylic acid include alkyl ester of the above-described aromatic dicarboxylic acid (methyl ester, ethyl ester, etc.), aryl ester, and carbonic ester. The aromatic dicarboxylic acid component may employ one kind of the above alone, or alternatively two or more kinds of the above.

Other than the above-described aromatic dicarboxylic acid component, alicyclic dicarboxylic acid such as cyclohexanedicarboxylic acid, aliphatic dicarboxylic acid such as adipic acid and azelaic acid, and/or ester derivatives thereof may be employed as other copolymer components.

The total amount of the aromatic dicarboxylic acid component is preferably 80 mol % or more, more preferably 90 mol % or more, relative to the total amount by mol (100 mol %) of the all acid components. It is especially preferable that the acid component comprises substantially only the aromatic dicarboxylinc acid component and thus does not substantially comprise the other copolymer component (the acid component other than the aromatic dicarboxylic acid component).

Examples of the diol component include diol, and ester derivative thereof. Examples of the dial include aliphatic diol such as ethylene glycol, 1,4-butanediol and 1,6-hexanediol, and alicyclic diol such as 1,4-cyclohexanediol and 1,4-cyclohexanedimethanol. An example of the ester derivative of the diol includes acetylated diol of the above-described diol. The diol component may employ one kind of the above alone, or alternatively two or more kinds of the above.

In the hard segment, the aromatic polyester unit preferably has a naphthalene ring. A polybutylene naphthalate unit is especially preferable as the component unit having the naphthalene ring. The polybutylene naphthalate unit is obtained, for example, by using naphthalene-2,6-dicarboxylic acid as the aromatic dicarboxylic acid component and 1,4-butanediol as the diol component. The aromatic polyester unit having the polybutylene naphthalate unit may be formed by only the polybutylene naphthalate unit or alternatively may include other component unit (for example, a polybutylene isophthalate unit).

The polyether unit in the soft segment comprises, for example, an aliphatic polyether unit. Examples of the aliphatic polyether unit include a poly(ethylene oxide) glycol unit, a poly(propylene oxide) glycol unit, a poly(tetramethylene oxide) glycol unit, a poly(hexamethylene oxide) glycol unit, and a copolymer of ethylene oxide and propylene oxide. The aliphatic polyether unit may employ one kind of the above alone, or alternatively two or more kinds of the above.

The polyester unit in the soft segment comprises, for example, an aliphatic polyester unit. Examples of the aliphatic polyester unit include a poly(ε-caprolactone) unit, a polyenantholactone unit, a polycaprylolactone unit, a polybutylene adipate unit, and a polyethylene adipate unit. The aliphatic polyester unit may employ one kind of the above alone, or alternatively two or more kinds of the above.

An example of the polyester elastomer, which is commercially available, includes Pelprene EN type (produced by TOYOBO CO., LTD.). The Pelprene EN type has a chemical structure shown in the following formula (3). The formula (4) shows the hard segment. The formula (5) shows the soft segment. As shown in the formula (3), the component unit of the hard segment and the component unit of the soft segment are connected through an ester bond or a carbonate bond. In the Pelprene EN type, the hard segment is formed by only the aromatic polyester unit, more specifically the polybutylene naphthalate unit. Examples of the specific grade of the Pelprene EN type include EN-1000, EN-2000, EN-3000, EN-5000, and EN-16000. Each grade has each ratio of the hard segment and the soft segment, and thus the properties (the bending elastic modulus or the like) are different from each other as described in Examples below.

Chemical 3

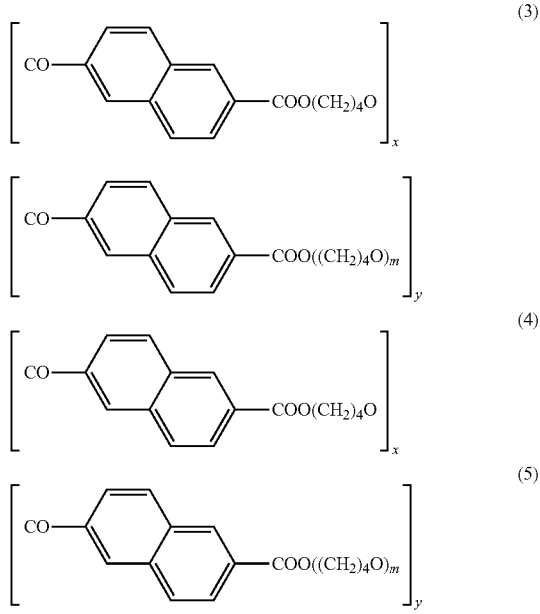

The hard segment that is formed by only the aromatic polyester having the naphthalene ring in a molecule such as the Pelprene EN type, can improve the chemical resistance and oil resistance of the polyester elastomer, compared to a configuration in which the aromatic polyester that does not have the naphthalene ring. Thus, it is suitable to the shaft seal for the rotational shaft of the compressor used in the presence of fluid in which the refrigerant and the refrigerator oil are mixed.

The ratio of the hard segment and the soft segment in the copolymerization of the polyester elastomer is not especially limited, however since the bending elastic modulus becomes large as the ratio of the hard segment is increased, it is preferable to adjust the ratio of the hard segment and the soft segment such that the bending elastic modulus of the thermoplastic resin elastomer composition is within a range of 200-2,400 MPa. Further, it is preferable to employ the polyester elastomer having the bending elastic modulus (ASTM D790) of 150-1,700 MPa because the bending elastic modulus of the molded body is easily set within the desired range.

The thermoplastic elastomer composition contains preferably 60 vol % or more, more preferably 80 vol % or more, further more preferably 90 vol % or more of the elastomer (for example, polyester elastomer) as a main component, relative to 100 vol % of the thermoplastic elastomer composition.

It is preferable to compound a solid lubricant such as PTFE resin, graphite, and molybdenum disulfide into the thermoplastic elastomer composition used in the present invention, in order to improve the friction and wear performance. Specifically, the thermoplastic elastomer composition contains preferably 1-40 vol % of the solid lubricant relative to 100 vol % of the thermoplastic elastomer composition. By compounding 1 vol % or more of the solid lubricant, the dynamic friction coefficient of the molded body of the thermoplastic elastomer composition can be reduced. In a case in which the content of the solid lubricant is more than 40 vol %, the elongation property of the thermoplastic elastomer composition is deteriorated, so that crack might be caused on the shaft seal when assembling the shaft seal to the rotation shaft. The thermoplastic elastomer composition contains more preferably 1-20 vol %, further more preferably 1-10 vol % of the solid lubricant, relative to 100 vol % of the thermoplastic elastomer composition. Further, PTFE resin is preferable as the solid lubricant. The PTFE resin and the graphite described with the above resin composition may be employed.

Further, a fiber reinforcing material such as carbon fiber, glass fiber, and aramid fiber; a spherical filler such as spherical silica; a scaly reinforcing material such as mica; a sliding reinforcing material such as calcium phosphate and calcium sulfate; and a fine fiber reinforcing material such as potassium titanate whisker may be compounded in the thermoplastic elastomer composition to such an extent that does not deteriorate the effect of the present invention. A colorant such as carbon black and iron oxide may be also compounded. One of them may be compounded alone, or alternatively a combination of two or more of them may be compounded.

In a case in which the carbon fiber is compounded, it is preferable to compound 5-20 vol % of the carbon fiber relative to 100 vol % of the thermoplastic elastomer composition. The carbon fiber described with the above resin composition may be employed.

From the above-described point of view, the especially preferable configuration of the shaft seal formed of the thermoplastic elastomer composition is a molded body of the thermoplastic elastomer composition in which the PTFE resin is compounded into the polyester elastomer. The polyester elastomer is a copolymer of the hard segment having the polybutylene naphthalate unit and the soft segment having the aliphatic polyether unit. The thermoplastic elastomer composition contains 1-10 vol % of the PTFE resin relative to the 100 vol % of the thermoplastic elastomer composition. The bending elastic modulus of the shaft seal based on ASTM D790 is 200-1,800 MPa.

The shaft seal of the present invention can be utilized in a scroll type compressor of an in-vehicle air conditioner. The scroll type compressor may be driven by a combustion engine using a belt, or alternatively by an electric motor without using power of a combustion engine. Further, the shaft seal of the present invention may be utilized in any apparatus other than the compressor.

The shaft seal of the present invention is molded by means of injection molding using a general injection molding machine for thermoplastic resin. After the materials that forms the above-described resin composition or the above-described thermoplastic elastomer composition are mixed as needed using a Henschel mixer, a ball mixer, a ribbon blender or the like, the materials are melt-kneaded using a melt extruder such as a twin-screw extruder to obtain molding pellets. Further, during the melt-kneading using a twin-screw extruder or the like, a side feed may be employed for charging the filling material. The shaft seal is molded by the injection molding using the molding pellets. In a case in which the PFA resin is employed as the base resin of the resin composition, the corrosion resistant injection molding machine and the corrosion resistant twin-screw extruder may be preferably used.

The shaft seal of the present invention is not limited to the examples shown in FIG. 1 to FIG. 3. In the shaft seals 1, 1' shown in FIG. 1 to FIG. 3, the inclined angles α of the seal lip part 2 are within 5-20 degrees, and the lip lengths $L_2$ of the seal lip part 2 are within 2.0-6.5 mm (these examples are referred to as a configuration A), however in a case in which the shaft seal having the following configuration B or C, the inclined angle α and the lip length $L_2$ need not necessarily fulfill the above-described numerical ranges.

The shaft seal having the configuration B is a ring-shape shaft seal that adheres to the outer peripheral surface of the rotational shaft and thus seals the sealed fluid. A gap between the rotational shaft and the housing to which the shaft seal is mounted is partitioned by the shaft seal into the high-pressure side and the low-pressure side. The shaft seal has a generally U-shape in a sectional view about an axial direction. The shaft seal includes the seal lip part that extends to the high-pressure side and slides on the rotational shaft, and the outer lip part disposed at the outer diametrical side relative to the seal lip part. The shaft seal is a molded body of the resin composition that contains the ETFE resin or the PFA resin as a main component. As the inner diameter size before the rotational shaft is mounted thereto is defined as d, the outer diameter size of the rotational shaft is defined as D and the interference of the shaft seal against the rotational shaft is defined as (D−d), the shaft seal fulfills (D−d)/D=0.005-0.06.

The shaft seal having the configuration B is a molded body of the resin composition that contains the ETFE resin or the PFA resin as a main component, and the value of (D−d)/D which is obtained by dividing the interference (D−d) by the outer diameter size D of the rotational shaft is set in the above-described range, so that the rotational torque can be decreased without deteriorating the sealing performance. Further, since the shaft seal is formed of the resin composition that contains the ETFE resin or the PFA resin as a main component, the shaft seal has superior flexibility and the shaft seal can be molded by means of injection molding. Further, since the shaft seal is superior in the chemical resistance and oil resistance, the shaft seal is suitably used in an environment in the presence of fluid such as a refrigerant and oil.

The shaft seal having the configuration C is a ring-shape shaft seal that adheres to the outer peripheral surface of the rotational shaft and thus seals the sealed fluid. The shaft seal has a generally U-shape in a sectional view about an axial direction. The shaft seal has the seal lip part that extends to one side in the axial direction and slides on the rotational shaft, and the outer lip part disposed at the outer diametrical side relative to the seal lip part. The shaft seal is a molded body of the thermoplastic elastomer composition that contains the polyester elastomer as a main component. The bending elastic modulus based on ASTM D790 of the shaft seal is 200-2,400 MPa.

The shaft seal having the configuration C has a generally U-shape in the sectional view about the axial direction, and the shaft seal has the seal lip part that extends to one side in the axial direction and slides on the rotational shaft, and the outer lip part disposed at the outer diametrical side relative to the seal lip part. Further, the shaft seal is a molded body of the thermoplastic elastomer composition that contains the polyester elastomer as a main component, and the bending elastic modulus based on ASTM D790 of the shaft seal is 200-2,400 MPa. Accordingly, the shaft seal can be realized that is capable of decreasing the rotational torque and is superior in sealing performance.

EXAMPLES

Test Example A

Test Examples A1 to A11

The resin composition that contains 20 vol % of PTFE resin (median particle diameter of 20 μm) as a solid lubricant, and polyamide 66 resin (viscosity number of 150 ml/g) as a residual part was produced by the twin-screw extruder to obtain pellets. The viscosity number is measured based on ISO 307 using a sulphuric acid solution. The shaft seal was formed by means of injection molding using the obtained pellets. The shaft seal has a shape shown in FIG. 1. As shown in Table 1, eleven types of the shaft seals (inner diameter size d of 19.88 mm) of which the inclined angle α and the lip length $L_2$ of the seal lip part are different were produced. The bending elastic modulus measured based on ASTM D790 of the resin composition that forms these shaft seals is 2,200 MPa.

(A-1) Rotational Torque Test

A rotational torque test was executed in the following condition using a rotational torque tester shown in FIG. 5 so as to measure the rotational torque and the oil leak amount. The outer diameter size D of the rotational shaft is 20 mm. The interference (D−d) of the shaft seal against the rotational shaft is 0.12 mm by diameter, which results in (D−d)/D=0.006.

Test Condition
  Rotational shaft: S45C
  Rotation speed: 7,500 $min^{-1}$
  Oil pressure: 0.3 MPa
  Oil temperature: 40° C.
  Refrigerator oil: polyalkylene glycol oil
  Test time: 60 minutes As shown in FIG. 5, a housing of a tester 14 is formed by assembling an outer housing 17 and an inner housing 18. An O-ring 19 is disposed in an outer circumferential groove of the inner housing 18 between the abutment surfaces of the housings so as to prevent the refrigerator oil from leaking through the abutment surfaces. A shaft seal 15 adheres to a rotational shaft 16 and slides on an outer peripheral surface of the rotational shaft 16 due to rotation of the rotational shaft 16. The refrigerator oil is pressure-fed to an inner space of the housing. As shown in FIG. 5, the refrigerator oil flows into the inner space of the housing through an inflow passage 17b and flows out through an outflow passage 17c. The oil leak amount is based on an amount of the refrigerator oil that leaks between the rotational shaft 16 and an insertion hole 17a. The oil leak amount is an average of the refrigerator oil that leaks during 10 minutes after 50 minutes since the test is started. The rotational torque is an average of the torque during 10 minutes after 50 minutes since the test is started. The results are shown in Table 1.

TABLE 1

|  | Test example A1 | Test example A2 | Test example A3 | Test example A4 | Test example A5 | Test example A6 | Test example A7 |
|---|---|---|---|---|---|---|---|
| Inclined angle α (degree) * | 20 | 20 | 20 | 20 | 20 | 5 | 10 |
| Lip length $L_2$ (mm) | 2.2 | 3.5 | 4.2 | 5.2 | 6.5 | 3.5 | 5.2 |
| Rotational torque (N·m) | 0.11 | 0.11 | 0.1 | 0.09 | 0.07 | 0.09 | 0.08 |
| Oil leak (ml/min) | ≤1 | ≤1 | ≤1 | ≤1 | ≤1 | ≤1 | ≤1 |

* Test examples A1 to A7 fulfill (D − d)/D = 0.006

|  | Test example A8 | Test example A9 | Test example A10 | Test example A11 |
|---|---|---|---|---|
| Inclined angle α (degree) * | 20 | 30 | 3 | 45 |
| Lip length $L_2$ (mm) | 1.2 | 3.5 | 3.5 | 3.5 |
| Rotational torque (N·m) | 0.16 | 0.15 | 0.09 | 0.17 |
| Oil leak (ml/min) | ≤1 | ≤1 | 10 | ≤1 |

* Test examples A8 to A11 fulfill (D − d)/D = 0.006

As shown in Table 1, when the results of the examples of which each inclined angle α is 20 degrees are compared, in the examples of which each lip length L2 is within 2.2-6.5 mm (the test examples A1 to A5), the rotational torque is low which is 0.07-0.11 Nm, while in the example of which the lip length L2 is 1.2 mm (the test example A8), the rotational torque is relatively large which is 0.16 N·m. Relating to the inclined angle α, in the example of which the inclined angle α is 3 degrees (the test example A10), the oil leak amount is largely increased. In the examples of which the inclined angles α are 30 and 45 degrees, respectively (the test examples A9 and A11), the rotational torques are 0.15 and 0.17 Nm, which means that the rotational torque is increased as the inclined angle α becomes larger. Each of the examples (the test examples A6 and A7) of which the inclined angles α are 5 and 10 degrees, respectively, shows low torque and less oil leak.

Test Example B

Next, the rotational torque and the sealing performance were evaluated by changing the components in the resin composition.

Test Examples B1 to B7

The materials of the resin composition used in each test example are collectively described below.

(1) ETFE resin: Fluon C-88AXMP produced by AGC Inc.
(2) PFA resin: Neoflon AP202 produced by DAIKIN INDUSTRIES, Ltd.
(3) Polyphenylene sulfide (PPS) resin: FZ-2100 produced by DIC Corporation
(4) Carbon fiber (average fiber length of 150 μm)
(5) Graphite (median particle diameter of 20 μm)
(6) PTFE resin (median particle diameter of 20 μm) The resin composition of each of the test examples B1 to B7 shown in Table 2 was produced by the twin-screw extruder using the materials (1) to (6) to obtain pellets. The shaft seal having the sectional shape shown in FIG. 1 and a molded body for a bending test were formed by means of injection molding using the obtained pellets.

(B-1) Bending Test

The bending test was executed based on ASTM D790 to measure the bending elastic modulus.

(B-2) Rotational Torque Test

Figure 5:
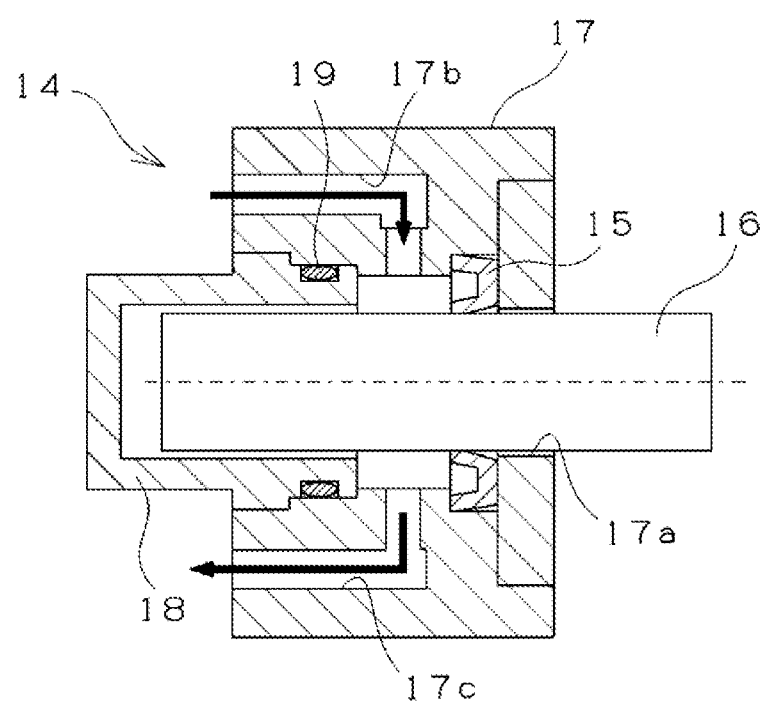
FIG. 5 is a schematic view of a measurement test of rotational torque.
Figure 6:
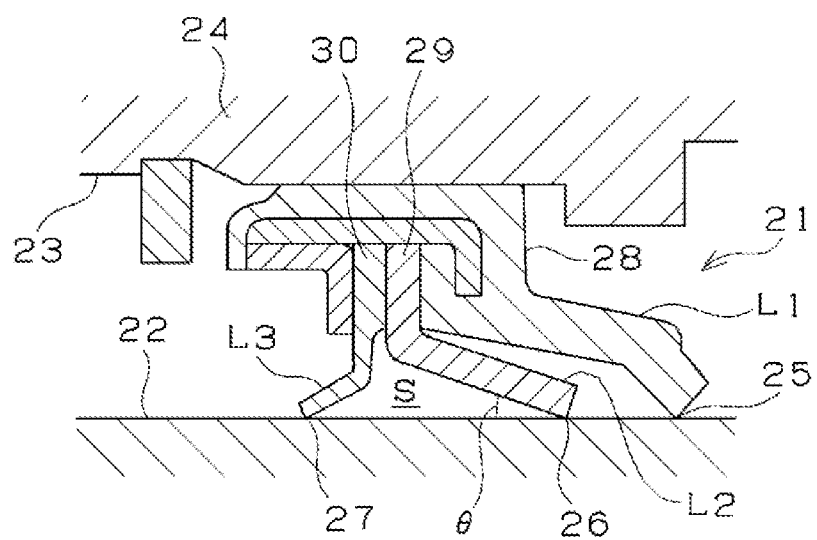
FIG. 6 is a sectional view of a conventional shaft seal.
Figure 7:
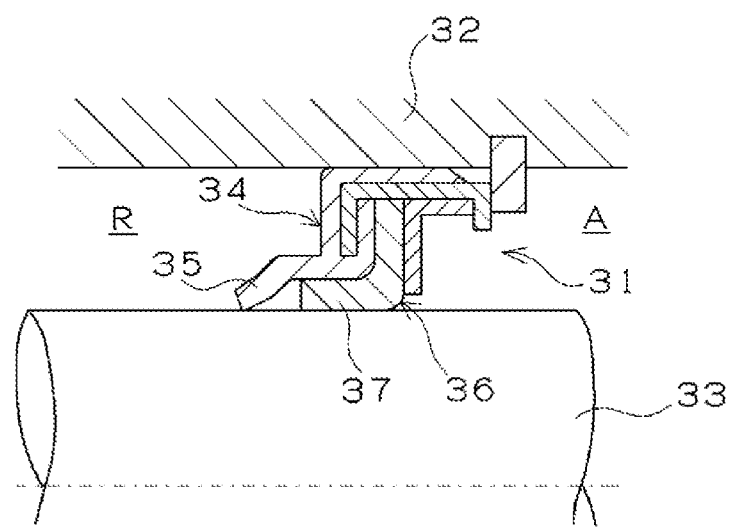
FIG. 7 is a sectional view of another conventional shaft seal.

The rotational torque test was executed in the above-described condition using the rotational torque tester shown in FIG. 5 so as to measure the rotational torque and the oil leak amount. The dimensions of the rotational shaft of the rotational torque tester and the shaft seal are set to fulfill that the outer diameter size D of the rotational shaft is 20.5 mm, the inner diameter size d of the shaft seal is 20 mm, the interference (D−d) is 0.5 mm, and (D−d)/D=0.024. Further, the inclined angle α is 5 degrees and the lip length $L_2$ is 3.5 mm.

TABLE 2

|  | Test example B1 | Test example B2 | Test example B3 | Test example B4 | Test example B5 | Test example B6 | Test example B7 |
|---|---|---|---|---|---|---|---|
| Component (vol %) Base resin | | | | | | | |
| ETFE resin | 100 | 94 | — | — | — | — | — |
| PFA resin | — | — | 97 | 90 | 80 | 75 | — |
| PPS resin | — | — | — | — | — | — | 100 |

TABLE 2-continued

|  | Test example B1 | Test example B2 | Test example B3 | Test example B4 | Test example B5 | Test example B6 | Test example B7 |
|---|---|---|---|---|---|---|---|
| Additive |  |  |  |  |  |  |  |
| Carbon fiber | — | 3 | — | 10 | — | — | — |
| Graphite | — | — | — | — | 20 | — | — |
| PTFE resin | — | 3 | 3 | — | — | 25 | — |
| Bending elastic modulus (MPa) [1] | 870 | 920 | 620 | 1,520 | 2,310 | 410 | 3,330 |
| Rotational torque (N · m) | 0.10 | 0.09 | 0.08 | 0.11 | 0.13 | 0.08 | 0.20 |
| Oil leak (ml/min) | ≤1 | ≤1 | ≤1 | ≤1 | ≤1 | ≤1 | 5 |

[1] ASTM D790
*) Test examples B1 to B7 fulfill $(D - d)/D = 0.024$
*) Test examples B1 to B7 fulfill that the inclined angle $\alpha = 5$ degrees and the lip length $L_2 = 3.5$ mm As shown in Table 2, the shaft seal of each of the test examples B1 to B6 of which each bending elastic modulus is within a range of 200-2,400 MPa shows low torque and less oil leak performance. However, the shaft seal of the test example B7 of which the bending elastic modulus is relatively large (the bending elastic modulus of 3,330 MPa) shows relatively high torque which is the rotational torque of 0.20 N·m. The results shown in Table 2 indicate a rough correlation between the magnitude of the bending elastic modulus and the magnitude of the rotational torque.

Test Examples B8 to B11

The rotational torque and the sealing performance were evaluated using the shaft seals each formed of the resin composition which is the same as that of the test example B2 (ETFE resin: 94 vol %, carbon fiber: 3 vol %, and PTFE resin: 3 vol %), adopting four kinds of the interferences. The test condition of the rotational torque test is the same as the above-described test condition.

TABLE 3

|  | Test example B8 | Test example B9 | Test example B10 | Test example B11 |
|---|---|---|---|---|
| Outer diameter size D of rotational shaft (mm) | 20 | 20 | 20 | 20 |
| Inner diameter size d of shaft seal (mm) | 19.9 | 19 | 19.98 | 18.6 |
| Interference (D − d) (mm) | 0.1 | 1 | 0.02 | 1.4 |
| (D − d)/D | 0.005 | 0.05 | 0.001 | 0.07 |
| Rotational torque (N · m) | 0.07 | 0.14 | 0.05 | 0.26 |
| Oil leak (ml/min) | ≤1 | ≤1 | 51 | ≤1 |

* Test examples B8 to B11 fulfill that the inclined angle $\alpha = 5$ degrees and the lip length $L_2 = 3.5$ mm As shown in Table 3, relating to the size ratio (D−d)/D, the oil leak amount is increased as (D−d)/D becomes smaller (the test example B10), and the torque is increase as (D−d)/D becomes larger (the test example B11). According to Table 3, in a range of (D−d)/D=0.05-0.005, low torque and less oil leak are shown (the test examples B8 and B9).

Test Example C

Next, the rotational torque and the sealing performance were evaluated using the shaft seal of the injection-molded body of the thermoplastic elastomer composition.

Test Examples C1 to C8

The materials of the thermoplastic elastomer composition used in each test example are collectively described below. Each of TPE-1 to TPE-4 has the chemical structure shown in the above-described formula (3).

(1) Polyester elastomer (TPE-1): EN-1000 (bending elastic modulus of 120 MPa) produced by TOYOBO CO., LTD.

(2) Polyester elastomer (TPE-2): EN-3000 (bending elastic modulus of 270 MPa) produced by TOYOBO CO., LTD.

(3) Polyester elastomer (TPE-3): EN-5000 (bending elastic modulus of 480 MPa) produced by TOYOBO CO., LTD.

(4) Polyester elastomer (TPE-4): EN-16000 (bending elastic modulus of 1,630 MPa) produced by TOYOBO CO., LTD.

(5) PTFE resin (median particle diameter of 20 μm)

(6) Graphite: M-107T (fiber diameter of 18 μm, average fiber length of 0.4 mm) produced by Kureha Corporation.

The thermoplastic elastomer composition of each of the test examples C1 to C8 shown in Table 4 was produced by the twin-screw extruder using the materials (1) to (6) to obtain pellets. The shaft seal having the sectional shape shown in FIG. 1 and a molded body for a bending test were formed by means of injection molding using the obtained pellets.

(C-1) Bending Test

The bending test was executed based on ASTM D790 to measure the bending elastic modulus.

(C-2) Rotational Torque Test

The rotational torque test was executed in the above-described condition using the rotational torque tester shown in FIG. 5 so as to measure the rotational torque and the oil leak amount. The dimensions of the rotational shaft of the rotational torque tester and the shaft seal are set to fulfill that the outer diameter size of the rotational shaft is 40 mm, the inner diameter size d of the shaft seal is 20 mm, and the interference (D−d) is 0.3 mm.

TABLE 4

| | Test example C1 | Test example C2 | Test example C3 | Test example C4 | Test example C5 | Test example C6 | Test example C7 | Test example C8 |
|---|---|---|---|---|---|---|---|---|
| Component (vol %) Polyester elastomer | | | | | | | | |
| TPE-1 | — | — | — | — | — | 97 | — | — |
| TPE-2 | 97 | — | — | — | — | — | — | — |
| TPE-3 | — | — | — | — | 97 | — | — | — |
| TPE-4 | — | 97 | 65 | 87 | — | — | 55 | 77 |
| Additive | | | | | | | | |
| PTFE resin | 3 | 3 | 35 | 3 | 3 | 3 | 45 | 3 |
| Carbon fiber | — | — | — | 10 | — | — | — | 20 |
| Bending elastic modulus (MPa) [1] | 224 | 1,580 | 1,204 | 2,330 | 465 | 111 | 1,138 | 3,937 |
| Rotational torque (N·m) | 0.08 | 0.09 | 0.08 | 0.12 | 0.08 | 0.08 | —[2] | 0.19 |
| Oil leak (ml/min) | 3 | ≤1 | ≤1 | ≤1 | ≤1 | 10 | —[2] | ≤1 |
| Break in assembling | No | No | No | No | No | No | Yes | No |

[1] ASTM D790
[2] Test was not executed because the shaft seal was broken in assembling As shown in Table 4, the shaft seal of each of the test examples C1 to C5 of which each bending elastic modulus is within a range of 200-2,400 MPa shows low torque and less oil leak performance. The shaft seal of the test example C6 of which the bending elastic modulus is relatively small (the bending elastic modulus of 111 MPa) shows the oil leak amount of 10 ml/min, which is inferior to the test examples C1 to C5. The shaft seal of the test example C7 of which the content rate of the PTFE resin is 45 vol % which is larger than the others, shows less elongation at break, and thus the shaft seal was broken in assembling to the rotational shaft. The shaft seal of the test example C8 of which the bending elastic modulus is relatively large (the bending elastic modulus of 3,937 MPa) shows relatively high torque which is the rotational torque of 0.19 N·m.

As described above, one aspect of the present invention realizes low torque and less leak by optimizing the inclined angle of the seal lip relative to the outer peripheral surface of the rotational shaft and optimizing the lip length. Further, another aspect of the present invention realizes low torque and less leak by optimizing the component of the resin composition and the setting of the interference. Further, the other aspect of the present invention realizes low torque and less leak by optimizing the component of the thermoplastic elastomer composition and the bending elastic modulus. Each of the above aspects may be combined with preferable configuration as needed so as to realize further superior low torque and less leak.

INDUSTRIAL APPLICABILITY

The shaft seal of the present invention is capable of decreasing rotational torque and realizing superior sealing performance. Accordingly, the shaft seal of the present invention can be widely used as a shaft seal that seals the sealed fluid while sliding on the outer peripheral surface of the rotational shaft. In particular, the shaft seal of the present invention is suitable to a shaft seal for a rotational shaft that rotates a compression mechanism part of a scroll type refrigerant compressor for an in-vehicle air conditioner.

REFERENCE SIGNS LIST 1, 1': shaft seal
2: seal lip part
3: outer lip part
4: base part
5: recessed groove
6: rotational shaft
7: housing
8: annular groove
9: compression mechanism part
10: compression chamber
11: fixed rotor
12: movable rotor
13: discharge port
14: tester
15: shaft seal
16: rotational shaft
17: outer housing
18: inner housing
19: O-ring

The invention claimed is:

1. A shaft seal having a ring shape, the shaft seal being configured to:
  adhere to an outer peripheral surface of a rotational shaft; seal sealed fluid; and partition a gap between the rotational shaft and a housing to which the shaft seal is mounted, into a high-pressure side and a low-pressure side, the shaft seal being formed of an injection-molded body having a generally U-shape in a sectional view about an axial direction of said shaft seal,
  the shaft seal comprising:
  a seal lip part that is configured to extend to the high-pressure side and slide on the rotational shaft; and
  an outer lip part that is disposed at an outer diametrical side relative to the seal lip part,
  wherein:
  an inclined angle of the seal lip part relative to the outer peripheral surface of the rotational shaft is 5-20 degrees; wherein
  the seal lip part has a length in the sectional view about the axial direction of the shaft seal of 2.0-6.5 mm.

2. The shaft seal as defined in claim 1, wherein the shaft seal is formed of a resin composition or a thermoplastic elastomer composition.

3. The shaft seal as defined in claim 1, wherein the bending elastic modulus based on ASTM D790 of the shaft seal is 200-2,400 MPa.

4. The shaft seal as defined in claim 1, wherein the shaft seal is formed of a resin composition that contains ethylene-tetrafluoroethylene copolymer resin or tetrafluoroethylene-perfluoroalkoxyethylene copolymer resin as a main component.

5. The shaft seal as defined in claim 4, wherein the resin composition contains 1-20 vol % of at least one of carbon fiber, graphite, and polytetrafluoroethylene resin relative to 100 vol % of the resin composition.

6. The shaft seal as defined in claim 5, wherein the resin composition contains the carbon fiber of which the average fiber length is 20-200 μm.

7. The shaft seal as defined in claim 1, wherein:
the shaft seal is formed of a thermoplastic elastomer composition that contains polyester elastomer as a main component, and
the polyester elastomer is a copolymer of a hard segment having an aromatic polyester unit, and a soft segment having a polyester unit or a polyether unit.

8. The shaft seal as defined in claim 7, wherein the aromatic polyester unit has a naphthalene ring.

9. The shaft seal as defined in claim 7, wherein the thermoplastic elastomer composition contains 1-40 vol % of polytetrafluoroethylene resin relative to 100 vol % of the thermoplastic elastomer composition.

10. The shaft seal as defined in claim 1, wherein, as the inner diameter size of the shaft seal before the rotational shaft is mounted thereto is defined as d, the outer diameter size of the rotational shaft is defined as D, and the interference of the shaft seal against the rotational shaft is defined as (D−d), the shaft seal fulfills (D−d)/D=0.005-0.06.

11. The shaft seal as defined in claim 1, the shaft seal being configured to be used in a scroll type compressor having a compression mechanism in which a fixed scroll and a movable scroll that slews relative to the fixed scroll are combined, wherein the rotational shaft is configured to drive the compression mechanism.

12. The shaft seal as defined in claim 11, wherein the scroll type compressor is configured as a scroll type compressor of an in-vehicle air conditioner.

13. The shaft seal as defined in claim 1, wherein the sealed fluid contains oil.

14. A shaft seal having a ring shape, the shaft seal being configured to:
adhere to an outer peripheral surface of a rotational shaft; seal sealed fluid; and partition a gap between the rotational shaft and a housing to which the shaft seal is mounted, into a high-pressure side and a low-pressure side, the shaft seal having a generally U-shape in a sectional view about an axial direction,
the shaft seal comprising:
a seal lip part that is configured to extend to the high-pressure side and slide on the rotational shaft; and
an outer lip part that is disposed at an outer diametrical side relative to the seal lip part,
wherein:
the shaft seal is a molded body of a resin composition that contains ethylene-tetrafluoroethylene copolymer resin or tetrafluoroethylene-perfluoroalkoxyethylene copolymer resin as a main component, and
as the inner diameter size of the shaft seal before the rotational shaft is mounted thereto is defined as d, the outer diameter size of the rotational shaft is defined as D, and an interference of the shaft seal against the rotational shaft is defined as (D−d), the shaft seal fulfills (D−d)/D=0.005-0.06.

* * * * *